United States Patent [19]

Mori et al.

[11] 4,430,545
[45] Feb. 7, 1984

[54] METHOD FOR SUBMERGED-ARC WELDING A VERY LOW CARBON STEEL

[75] Inventors: Naomichi Mori, Yamato; Hiroyuki Homma, Isehara; Masakuni Wakabayashi, Sagamihara; Masanobu Yamaguchi, Kisarazu, all of Japan

[73] Assignee: Nippon Steel Corporation, Tokyo, Japan

[21] Appl. No.: 302,357

[22] Filed: Sep. 15, 1981

[30] Foreign Application Priority Data

Sep. 24, 1980 [JP] Japan .............................. 55-131578

[51] Int. Cl.³ .............................................. B23K 9/18
[52] U.S. Cl. ................... 219/73; 219/73.21; 219/137 WM; 219/146.24; 219/146.41
[58] Field of Search ................. 219/73 R, 73.2, 73.21, 219/146.24, 146.41, 137 WM

[56] References Cited

U.S. PATENT DOCUMENTS

| | | | |
|---|---|---|---|
| 3,745,294 | 7/1973 | Arikawa et al. | 219/73 R |
| 3,867,608 | 2/1975 | Ohwa et al. | 219/73 R |
| 3,924,091 | 12/1975 | Suzuki et al. | 219/73 R |
| 4,029,934 | 6/1977 | Clark et al. | 219/146.24 |
| 4,251,711 | 2/1981 | Tanigaki et al. | 219/146.24 |
| 4,282,420 | 8/1981 | Banks | 219/146.41 X |

FOREIGN PATENT DOCUMENTS 54-40250 3/1979 Japan .............................. 219/146.24

*Primary Examiner*—R. R. Kucia
*Attorney, Agent, or Firm*—Wenderoth, Lind & Ponack

[57] ABSTRACT

A method for producing line pipe of high strength and high toughness by the submerged-arc welding process in which a welding wire containing 0.18–0.55% C. is used, Ti or B or both are added to the welding wire or flux or both, and a steel containing 0.005–0.06% C. is welded by the submerged-arc welding process, whereby both Ti and B are caused to be present in the weld metal.

13 Claims, 5 Drawing Figures

METHOD FOR SUBMERGED-ARC WELDING A VERY LOW CARBON STEEL

I. BACKGROUND OF THE INVENTION

A. Field of the Invention

The present invention relates to a method for submerged-arc welding a very low carbon steel for obtaining line pipe with high strength, high toughness and high performance suitable for low temperature applications.

B. Description of the Prior Art

In the development of line pipe steel suitable for use in cold climate, remarkable progress is being made in lowering the C eq. of low alloy high strength steels, and particularly in lowering the carbon content of such steels to a very low percentage so as to obtain steels with good weldability and low temperature toughness.

Further, advances in controlled rolling technology have made available various low-carbon steels containing not more than 0.06%C(as compared with ordinary steels which contain as much as 0.1%C).

At the present time, line pipe is being produced from high strength low alloy steels, using the submerged-arc welding process, wherein with a view to improving low temperature toughness, a welding flux to which Ti and B are added and a welding wire of one of the following specified compositions are used in combination. The compositions of the welding wires are as follows:

TABLE 1

| | (wt %) | | | |
|---|---|---|---|---|
| | C | Si | Mn | Mo |
| JIS SAW32 | ≦0.15 | 0.05–0.25 | 1.30–1.80 | # |
| JIS SAW41 | ≦0.17 | ≦0.05 | 1.80–2.20 | # |
| AWS Standard EA3 | 0.10–0.18 | ≦0.05 | 1.70–2.40 | 0.45–0.65 |
| AWS Standard EH14 | 0.10–0.18 | 0.05–0.30 | 1.75–2.25 | — |

Note:
JIS: Japanese Industrial Standard
SAW: Submerged Arc Welding
AWS: American Welding Society
: Mo and/or Ni, etc. included in addition to JIS-specified components.

In making a tubular product of the above steel, various processes, such as the UOE (U-ing and O-ing expander), spiral seam pipe making, and the bending roll method are being used.

In accordance with the conventional method, a low alloy steel containing a low carbon content of 0.05% was subjected to controlled rolling to produce a steel sheet which was then formed into a tubular shape. The tubular product was subjected to submerged-arc welding with the combined application of a welding wire containing 0.10%C, 2.0%Mn and 0.5%Mo corresponding to an AWS standard EA3 wire, and a melt type flux of the $TiO_2$ and $B_2O_3$ containing system. Mechanical properties of the weld metal thus obtained were examined. The results obtained are shown in Table 2.

TABLE 2

| Combinations Test | | | Results of 2 mm V Notch Charpy |
|---|---|---|---|
| Steel Sheet | Welding Wire | Welding Flux | Impact Test |
| Very low C steel* | 0.1% C-2% Mn-0.5% Mo | Melt flux of $TiO_2$—$B_2O_3$ | Number of Tests 60 Average value 18.1 kg-m Fluctuation $\sigma = 3.5$ |
| Ordinary C steel** | 0.1% C-2% Mn-0.5% Mo | Melt flux of $TiO_2$—$B_2O_3$ | Number of Tests 60 Average value 20.5 kg-m Fluctuation $\sigma = 0.9$ |

*Steel of 0.05 C-0.3 Si-1.5 Mn-0.2 Ni-0.25 Mo-0.05 Nb-0.07 V-0.03 Al-0.01 Ti
**Steel of 0.09 C-0.3 Si-1.6 Mn-0.3 Cu-0.3 Ni-0.05 Nb-0.09 V-0.03 Al The investigations carried out by the inventors revealed a reduction in the high temperature ductility of the weld metal and a tendency toward promotion of the occurrence of defects in the weld metal. Consequently, as indicated by Table 2 the fluctuation in the low temperature toughness becomes greater than that of the weld metal of an ordinary steel containing the usual amount of carbon.

On the other hand, the ordinary low alloy steel containing 0.09%C welded by the above-mentioned submerged-arc welding process undergoes no reduction in high temperature toughness at all. And, as a result, the fluctuation in its low temperature toughness is small, as also shown in Table 2. In this way it was demonstrated that the problem inherent in the weld metal in welding very low C steel results from the combination of a welding wire containing an ordinary amount of C and a very low carbon steel.

II. SUMMARY OF THE INVENTION

The inventors sought to develop a submerged-ac welding process that would prevent the deterioration of the high temperature toughness in the weld metal of a very low carbon steel, which at the same time assures a good low temperature toughness. Attention was first focused on the problem of reduction of the high temperature ductility, which was found to be closely related to the amounts of C and B in the weld metal.

It is one object of the present invention to provide a submerged-arc welding method for a very low carbon steel wherein both high temperature ductility and low temperature toughness are assured.

Another object of the invention is to provide a submerged-arc welding method for very low carbon steel line pipe wherein both high temperature ductility and low temperature toughness are assured in the weld metal.

A still further object of the invention is to provide a submerged-arc welding method for line pipe of a very low carbon steel wherein a suitable combination of very low carbon steel, welding wire and welding flux is properly selected.

III. BRIEF EXPLANATION OF THE DRAWINGS

Other and further objects of the invention will be better understood in the following detailed description with reference to the accompanying drawings in which.

IV. DETAILED DESCRIPTION OF THE INVENTION

Figure 1:
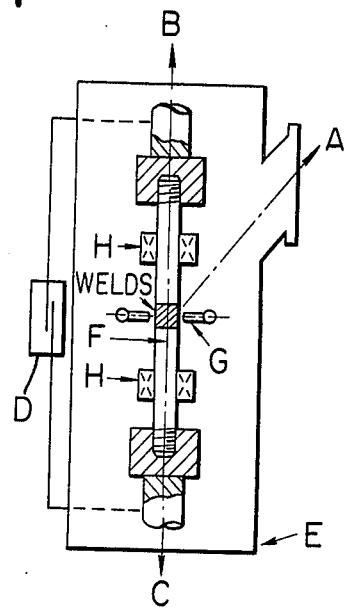
FIG. 1 is a schematic view of a weld freezing thermal cycle simulator apparatus.

FIG. 1 is a schematic view of the weld freezing thermal cycle simulator apparatus used by the inventors. The illustrated apparatus has an infrared thermometer A, a hydraulic loading cylinder B with an air-operated accumulator, a load cell C, a dilatometer D, a chamber E, a test specimen F, an induction coil G, and two watercooled copper blocks H. A detailed explanation of the simulator apparatus can be found in "A Mechanism of High Temperature Cracking in Steel Weld Metals", Welding Journal, Vol. 58 (1979), September, pages 277-S.

Figure 2:
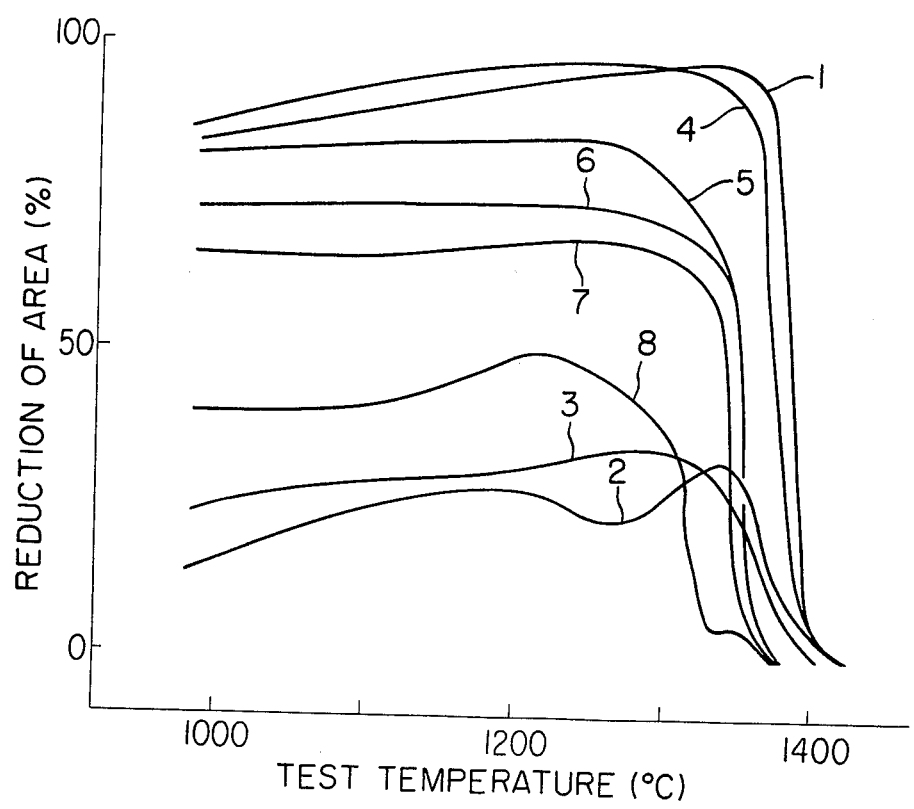
FIG. 2 is a graph showing the high temperature ductilities of various solidified metals investigated by means of the weld freezing thermal cycle simulator test apparatus.

FIG. 2 is a graph showing the results of test conducted using the weld freezing thermal cycle simulator apparatus in which the temperature dependence of the ductility immediately after the freezing of various solidified metals is illustrated.

Figure 3:
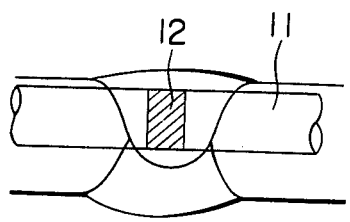
FIG. 3 is a schematic view showing the sampling position of a test specimen from the weld freezing cycle simulator apparatus.

FIG. 3 shows the submerged-arc weld metal 12 of a 10 mm round bar 11 under test. The chemical compositions of the portion 12 of eight tested specimens are shown in Table 3.

Namely, Nos. 1–8 shown in FIG. 2 are the high temperature ductilities of solidified metals having the chemical compositions shown in Table 3.

TABLE 3

| No. | C | Si | Mn | P | S | Mo | Ti | B | vE-50 (kg-m) |
|---|---|---|---|---|---|---|---|---|---|
| 1 | 0.03 | 0.26 | 1.62 | 0.018 | 0.015 | 0.13 | 0.01 | — | 2.8 |
| 2 | 0.03 | 0.27 | 1.58 | 0.019 | 0.012 | 0.12 | 0.02 | 0.0045 | 6.7 |
| 3 | 0.06 | 0.27 | 1.63 | 0.017 | 0.017 | — | 0.01 | 0.0051 | 12.2 |
| 4 | 0.07 | 0.26 | 1.58 | 0.015 | 0.016 | — | — | — | 2.5 |
| 5 | 0.07 | 0.25 | 1.59 | 0.016 | 0.013 | — | 0.02 | 0.0039 | 12.0 |
| 6 | 0.12 | 0.31 | 1.60 | 0.017 | 0.012 | 0.12 | 0.01 | — | 3.2 |
| 7 | 0.13 | 0.29 | 1.58 | 0.015 | 0.015 | 0.12 | 0.02 | 0.0044 | 10.5 |
| 8 | 0.14 | 0.30 | 1.64 | 0.015 | 0.013 | 0.12 | 0.02 | 0.0047 | 7.8 |

The tested portion is about 6 mm wide and is subjected to heating, melting, and cooling in a thermal cycle simulating that of submerged-arc welding. During cooling, the test portion was fractured by an external force. The ductility at the time of fracture is usually shown by the reduction of area (%) ([sectional area as frozen-sectional area after fracture/sectional area as frozen]×100). If the reduction of area maintains a value of more than 50% between 1300°–1000° C. after it abruptly rises from zero at the freezing point, then there is no danger of a defect occurring even in a case where transitional deformation is apt to occur, as in pipe-making by welding.

It is known that the high temperature ductility of the weld metal of a low alloy steel can be improved as the carbon content of the steel decreases. This agrees with FIG. 2 which shows that, in a system containing no boron, a good high temperature tensile ductility is obtained if the carbon content falls below a certain level.

On the other hand, however, this does not hold in the weld metal of a steel containing boron. FIG. 2 shows that the high temperature ductility of a boron-containing steel is greatly reduced even when the C content is between 0.06% and 0.14%. This will be examined more closely in the following.

Among the system Nos. 1, 4 and 6 which contain no boron at all it will be noted that system No. 6 containing 0.12%C shows a relatively low value of ductility. Nevertheless, the ductility of the steel of system No. 6 remains higher than 50% at all temperatures between 1300° C. and 1000° C. so that there is no danger of its developing defects under a highly restrained condition.

Next, consider the steel of system No. 2 which like that of system No. 1 contains 0.03%C but which also contains 0.0045%B. Here, there is only a small recovery in the ductility immediately following the freezing point and, moreover, the value of the ductility remains extremely low (less than about 30%) at all temperatures below 1300° C. A similar tendency is observed in No. 3 containing 0.06%C and 0.0051%B. If a great deformation is given to the frozen metal of Nos. 2 and 3, there is a possibility that a defect, namely a "crack", will occur in the bead bend test.

No. 5 which contains 0.07%C and 0.0039%B has a somewhat lower ductility than that of No. 4 which also contains 0.07%C but contains no boron at all. Still it will be noted that No. 5 indicates a rapid recovery of ductility immediately following the freezing point and, furthermore, that it has a ductility of more than 80% at temperatures below 1300° C. Thus there is no danger of this steel developing defects.

Although No. 7 containing 0.13%C and 0.0044%B has a much lower ductility than that of No. 5, its ductility at temperatures below 1300° C. is about 70% so that there is no danger of defects.

No. 8, which contains 0.14%C and 0.0047%B, is like Nos. 2 and 3 in that it suffers from poor recovery of ductility following the freezing point. Moreover, its ductility at temperatures below 1300° C. is about 40% except in the vicinity of 1200° C. where it reaches 50%. Therefore there is a danger that defects may occur under conditions of high restraint.

Figure 4:
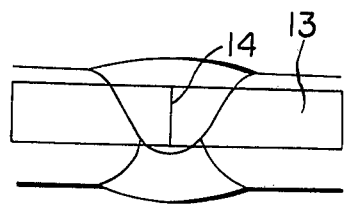
FIG. 4 is a schematic view showing the sampling position of a test specimen for the Charpy impact test.

Meanwhile, as indicated in FIG. 4, test specimens 13 were subjected to the Charpy impact test with the tested portion of the samples being the same as that in the weld freezing cycle simulator test. The Charpy impact test specimen was given a notch 14 and the test was conducted at −50° C. The results are indicated in Table 3.

Comparing Nos. 3, 5, and 7 having good low temperature toughness with Nos. 4 and 6 having poor low temperature toughness, it is seen that satisfactory low temperature toughness cannot be obtained unless both Ti and B are present.

Besides, as is clear from a comparison between No. 2 and Nos. 3, 5, and 7, even when both Ti and B are present, a satisfactory low temperature toughness cannot be obtained if the carbon content of the weld metal is extremely low.

On the other hand, if the content of C exceeds 0.14% as in No. 8, the low temperature toughness is also poor.

On the basis of the findings thus obtained, the inventors have accomplished the present invention, which is directed to a method for submerged-arc welding a very low carbon steel characterized by using a welding wire containing 0.18–0.55%C, having either or both of Ti and B contained in either or both of the welding wire and a welding flux so as to include a combination of Ti and B in the weld metal, and subjecting a steel containing 0.005–0.06%C to submerged-arc welding using said wire and flux.

The very low carbon steel to which the present invention is directed is a low alloy high strength steel suitable for line pipe for use in cold climates. Examples of the compositions of such steel are as follows:

| No. | C | Si | Mn | P | S | Cr | Ni | Mo | Nb | V | Ti | B |
|---|---|---|---|---|---|---|---|---|---|---|---|---|
| | | | | | | (wt %) | | | | | | |
| A | 0.049 | 0.29 | 1.56 | 0.017 | 0.005 | 0.01 | 0.27 | 0.25 | 0.049 | 0.068 | 0.007 | — |
| B | 0.021 | 0.14 | 1.59 | 0.018 | 0.003 | — | — | — | 0.041 | — | 0.017 | 0.0010 |

The present invention will now be described in detail hereinbelow.

In welding a steel containing 0.005–0.06%C by the submerged-arc welding method, the welding wire should contain 0.18–0.55%C. The reason for this is as follows. To assure satisfactory high temperature ductility with a view to preventing the occurrence of defects in a weld metal containing B, it is required that the carbon content of the weld metal be in the range of 0.07–0.13%. In submerged-arc welding a steel containing 0.005%C, the carbon content of the weld metal falls in this range if the welding wire contains 0.30–0.55%C. On the other hand, is submerged-arc welding a steel containing 0.06%C, the carbon content of the weld metal falls in the specified range if the welding wire contains 0.18–0.33%C.

Based on the above consideration, the carbon content of the welding wire for submerged-arc welding a steel containing 0.005–0.06%C has been specified as falling in the range of 0.18–0.55%. If the carbon content falls in the above range, it is seen that the low temperature toughness of the weld metal is also much improved.

It is of prime importance for the present invention that either or both of the welding wire and the welding flux should contain either or both of Ti and B so that the weld metal will contain both Ti and B.

When present together with B, Ti is an effective element for making the microstructure much finer and thus improving the low temperature toughness.

For the purpose of reducing fractuation in low temperature toughness and assuring a good low temperature toughness, it is indispensable to cause both of these elements to be present in the weld metal by including them in either or both of the welding wire and the welding flux.

The amount of Ti and B present in the weld metal should be in the range of 0.004–0.035%Ti or 0.001–0.005%B.

If the total amount of Ti added to the weld metal is less than 0.004%, a satisfactory low temperature toughness cannot be attained; and if it exceeds 0.035%, it is undesirable because the toughness of the reheated weld metal is deteriorated.

If Ti is to be added to the weld metal from a solid welding wire, it is included in the welding wire, and should be contained as an alloying element in the range of 0.004–0.035 weight %. If a flux-cored wire is used, Ti is added in the form of ferrotitanium.

If Ti is added from the welding flux, it may be added as rutile, titanium slag or ferrotitanium. Further, if Ti is added from the welding flux in the form of rutile, titanium slag or ferrotitanium, the addition of 5–30% in terms of TiO₂ or 0.5–5% in terms of ferrotitanium (Ti 50%) will be equivalent to the addition of 0.004–0.035-%Ti to the weld metal.

With regards to the addition of B, if the total amount of B contained in the weld metal is less than 0.001% sufficient low temperature toughness cannot be obtained while, if it exceeds 0.005%, it is undesirable because it increases the susceptibility to high temperature cracking.

In case B is added from a solid welding wire, it is preferred that it should be included in the wire as an alloying element in the range of 0.002–0.010%. If the welding wire is a flux-cored wire, B may be added as an alloying element in the form of ferroboron. B may also be added from the welding flux in the form of boric acid, borate or an alkaline metal salt containing B, such as, borax, or ferroboron.

When B is added from the welding flux in the form of boric acid, borate, borax or ferroboron, the addition of 0.05–1.0% in terms of B₂O₃ or 0.07–1.7% in terms of ferroboron (B 20%) will be equivalent to the addition of 0.001–0.005B to the weld metal.

Moreover, with regards to such compounds as rutile, titanium slag, boric acid, borate, borax, etc., the same effect can be obtained by the use of either bonded flux or melt flux.

The welding wire to be used is preferred to contain 0.01–0.5%Si and 0.9–3.5%Mn as its main component. Namely, silicon in the welding wire is an effective element which works as a deoxidizing agent. If Si exceeds 0.5%, however, it will reduce the resistance to weld metal cracking. On the other hand, the deoxidizing effect will not be satisfactory if the Si content is less than 0.01%.

Manganese is an effective element for producing an acicular ferrite microstructure in the weld metal which improves the low temperature toughness. If Mn is less than 0.9%, an adequate low temperature toughness cannot be achieved. If it exceeds 3.5%, the low temperature toughness is also deteriorated, and a content exceeding 3.5% is further undesirable because the wire drawability is degraded.

It is understood that the invention specifies only that the carbon contents of the whole wire fall within the specified range; the welding wire used in this invention may be of any desirable form and, specifically, may be either a solid wire or a flux-cored wire made of a tubular wire charged with a metal or alloy powder which contains a part of the alloying composition.

Moreover, in addition to the above-mentioned elements, either or both of up to 0.6%Mo and up to 3.5%Ni may be added to the welding wire used in this invention.

An addition of up to 0.6%Mo is effective in improving the strength of the weld metal. When Mo exceeds 0.6%, however, the low temperature toughness is remarkably deteriorated. Ni is also effective in enhancing the low temperature toughness and may be added up to 3.5%. If more than 3.5% is added, however, the low temperature toughness is noticeably reduced.

As mentioned hereinbefore, one object of the invention lies in preventing B from lowering the hot ductility of the weld metal by limiting the carbon content of the weld metal to within the range of 0.07–0.13%. Therefore, when welding is carried out using multiple electrodes, it is not absolutely necessary for all of the welding wires to have the composition specified above. So long as the object of the invention can be achieved, it is possible to use ordinary welding wires together with welding wires and welding flux having the specified composition.

As regards the basicity of the welding flux used, satisfactory welding work can be carried out with a flux having a basicity falling in the range of 0.5–2.5 in accordance with the designation of IIW (International Institute of Welding). The formula for determining the basicity is as follows:

$$\text{Basicity} = \frac{CaO,\% + MgO,\% + BaO,\% + CaF_2,\% + \frac{1}{2}(MnO,\% + FeO,\%)}{SiO_2,\% + \frac{1}{2}(Al_2O_3,\% + TiO_2,\%)}$$

If the basicity becomes less than 0.5, oxygen content in the weld metal increases extremely to deteriorate the low temperature toughness; if the basicity becomes more than 2.5, it is difficult to maintain good welding workability.

The effects and advantages of the present invention will be further demonstrated in connection with the following examples.

Tables 4a, 4b indicate the chemical compositions of welding wires, fluxes, and steel plates together with the welding conditions therefor.

In Tables 4a and 4b, A, C, E, G, M, N, O, P, Q and R are comparisons while B, D, F, H, I, J, K and L are examples according to the present invention. The test specimens for the Charpy impact test were taken from each joint in the manner as illustrated in FIG. 4, and the test specimens for the longitudinal bead bend test were taken from the same region.

TABLE 4a

| No. | Chemical Composition of Wire (%) | | | | | | | | Wire diam. (mm) | Kind of wire | Chemical Composition of Flux (%) | | | | | | | | | Basic-ity | Kind of Flux | Particle size (mesh) |
|---|---|---|---|---|---|---|---|---|---|---|---|---|---|---|---|---|---|---|---|---|---|---|
| | C | Si | Mn | Mo | Ni | Ti | B | | | | $SiO_2$ | $Al_2O_3$ | $TiO_2$ | CaO | MgO | BaO | $CaF_2$ | Others | $B_2O_3$ | | | |
| A | 0.60 | 0.55 | 2.04 | — | — | — | — | | 4.0 | Solid wire | 12.5 | 17.7 | 24.2 | 4.9 | — | 24.6 | 14.0 | — | 0.7 | 1.30 | melt | 40 × 250 |
| B | 0.19 | 0.11 | 1.97 | — | — | — | — | | 4.0 | Solid wire | 12.5 | 17.7 | 24.2 | 4.9 | — | 24.6 | 14.0 | — | 0.7 | 1.30 | " | " |
| C | 0.09 | 0.03 | 1.98 | 0.25 | 0.01 | 0.22 | — | | 4.8 | Solid wire | 14.9 | 38.2 | — | 15.8 | — | — | 29.9 | — | 0.3 | 1.34 | " | 20 × 250 |
| D | 0.21 | 0.09 | 2.52 | 0.23 | — | 0.23 | — | | 4.8 | Solid wire | 14.9 | 38.2 | — | 15.8 | — | — | 29.9 | — | 0.3 | 1.34 | " | " |
| E | 0.11 | 0.15 | 3.6 | 0.25 | — | — | 0.006 | | 4.8 | Flux-cored wire** | 17.4 | 28.3 | 19.0 | 4.9 | — | 10.4 | 14.3 | MnO 5.3 | — | 0.85 | " | " |
| F | 0.27 | 0.12 | 2.02 | 0.43 | — | 0.12 | 0.006 | | 4.8 | Flux-cored wire** | 17.4 | 28.3 | 19.0 | 4.9 | — | 10.4 | 14.3 | MnO 5.3 | — | 0.85 | " | " |
| G | 0.15 | 0.08 | 1.42 | 0.52 | 0.05 | 0.31 | — | | 4.8 | Solid wire | 10.5 | 13.2 | 16.8 | 10.5 | 34.6 | — | 10.0 | $Na_2O$ 2.2 | 0.5 | 2.25 | bond | 12 × 100 |
| H | 0.26 | 0.15 | 1.58 | 0.19 | — | — | — | | 4.8 | Solid wire | 10.5 | 13.2 | 16.8 | 10.5 | 34.6 | — | 10.0 | $Na_2O$ 2.2 | 0.5 | 2.25 | " | " |
| I | 0.19 | 0.02 | 1.08 | — | 1.40 | 0.05 | — | | 4.8 | Solid wire | 14.9 | 28.2 | 19.1 | 4.8 | — | 10.2 | 14.6 | MnO 5.3 | 0.7 | 0.83 | melt | 20 × 250 |
| J | 0.51 | 0.15 | 1.03 | 0.01 | — | 0.03 | — | | 4.8 | Solid wire | 12.5 | 60.2 | — | 8.8 | 8.9 | — | 8.7 | — | 0.2 | 0.62 | " | " |
| K | 0.21 | 0.05 | 2.05 | — | — | 0.15 | 0.004 | | 4.0 | Solid wire | 14.9 | 28.2 | 19.1 | 4.8 | — | 10.2 | 14.6 | MnO 5.3 | 0.2 | 0.83 | " | " |
| L | 0.27 | 0.12 | 2.10 | 0.25 | — | — | 0.003 | | 4.0 | Solid wire | 14.9 | 28.2 | 19.1 | 4.8 | — | 10.2 | 14.6 | MnO 5.3 | — | 0.83 | " | " |
| M | 0.26 | 0.15 | 1.58 | 0.19 | — | — | — | | 4.8 | Solid wire | 14.4 | 6.2 | 16.8 | 15.2 | 1.4 | — | 3.5 | MnO 12.2 | 0.3 | 0.47 | " | 40 × 250 |
| N | 0.26 | 0.15 | 1.58 | 0.19 | — | — | — | | 4.8 | Solid wire | 12.8 | 19.0 | 0.6 | 13.2 | 27.2 | — | 26.1 | MnO 0.8 | 0.3 | 3.11 | " | " |
| O | 0.19 | 0.23 | 1.65 | 0.20 | — | — | — | | 4.8 | Solid wire | 10.5 | 13.2 | 16.8 | 10.5 | 34.6 | — | 10.0 | $Na_2O$ 2.2 | 0.5 | 2.25 | bond | 12 × 100 |
| P | 0.31 | 0.14 | 1.49 | — | — | — | — | | 4.8 | Solid wire | 10.5 | 13.2 | 16.8 | 10.5 | 34.6 | — | 10.0 | $Na_2O$ 2.2 | 0.5 | 2.25 | " | " |
| Q | 0.26 | 0.15 | 1.58 | — | — | — | — | | 4.8 | Solid wire | 14.9 | 28.2 | 19.1 | 4.8 | — | 10.2 | 14.6 | MnO 5.3 | — | 0.83 | melt | 20 × 250 |
| R | 0.26 | 0.15 | 1.58 | — | — | — | — | | 4.8 | Solid wire | 12.5 | 60.2 | — | 8.8 | 8.9 | — | 8.7 | — | 0.3 | 0.62 | " | " |

TABLE 4b

| No. | Thick (mm) | C | Si | Mn | Nb | V | Al | Ti | Mo | Other elements | Combination* |
|---|---|---|---|---|---|---|---|---|---|---|---|
| A | 25.0 | 0.05 | 0.32 | 1.54 | 0.04 | 0.05 | 0.019 | 0.014 | 0.20 | — | I |
| B | " | " | " | " | " | " | " | " | " | — | " |
| C | 19.5 | " | " | " | " | " | " | " | " | — | II |
| D | " | " | " | " | " | " | " | " | " | — | " |
| E | " | 0.025 | 0.14 | 1.91 | 0.06 | — | 0.020 | 0.019 | — | B 0.0012 | III |
| F | " | " | " | " | " | — | " | " | — | B 0.0012 | " |
| G | " | " | " | " | " | — | " | " | — | B 0.0012 | " |
| H | " | " | " | " | " | — | " | " | — | B 0.0012 | " |
| I | " | 0.05 | 0.38 | 1.28 | 0.03 | 0.03 | 0.03 | 0.010 | 0.10 | Ni 0.93 | II |
| J | " | 0.008 | 0.30 | 1.95 | 0.06 | — | 0.021 | 0.011 | — | B 0.0014 | " |
| K | " | 0.05 | 0.38 | 1.28 | 0.03 | 0.03 | 0.03 | 0.010 | 0.10 | Ni 0.93 | " |
| L | " | 0.025 | 0.14 | 1.91 | 0.06 | — | 0.02 | 0.019 | — | B 0.0005 | III |
| M | " | " | " | " | " | — | 0.020 | " | — | B 0.0012 | " |
| N | " | " | " | " | " | — | " | " | — | B 0.0012 | " |
| O | 22 | 0.003 | 0.35 | 1.95 | 0.05 | — | " | " | 0.21 | B 0.0008 | I |
| P | " | 0.09 | 0.24 | 1.56 | " | 0.07 | 0.022 | 0.015 | 0.10 | — | " |
| Q | 19.5 | 0.018 | 0.16 | 2.01 | " | — | 0.015 | 0.018 | 0.30 | B 0.0012 | III |
| R | " | " | " | " | " | — | " | " | " | B 0.0012 | " |

Note:
*Welding conditions:
Combination
No. I  600 A × 35 V × 300 mm/min. DC, Single Wire
The joint geometry is illustrated in FIG. 5,
where $t_1$ = 25 mm, $t_2$ = 8 mm, $t_3$ = 9 mm, $t_4$ = 8 mm
$\theta_1$ = 90°, $\theta_2$ = 90°.

Figure 5:
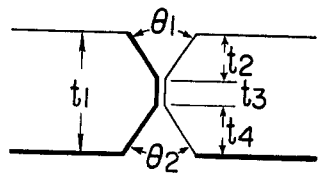
FIG. 5 is a view showing the joint geometry of plates used in the examples of the invention.

II  Leading electrode     1100 A × 35 V × 1100 mm/min  ⎫  AC, Tandem
    Trailing electrode     900 A × 40 V × 1100 mm/min  ⎭  wire (same)
The joint geometry is shown in FIG. 5, where
$t_1$ = 19.5 mm, $t_2$ = 7 mm, $t_3$ = 6 mm, $t_4$ = 6.5 mm
$\theta_1$ = 70°, $\theta_2$ = 90°.

III  Leading electrode        1350 A × 35 V × 1200 mm/min  ⎫  AC, 3-
     Intermediate electrode   1000 A × 40 V × 1200 mm/min  ⎬  electrode
     Trailing electrode        780 A × 38 V × 1200 mm/min  ⎭  wire (same)
The joint geometry is shown in FIG. 5, where
$t_1$ = 19.5 mm, $t_2$ = 7 mm, $t_3$ = 6 mm, $t_4$ = 6.5 mm
$\theta_1$ = 70°, $\theta_2$ = 90°.

**The flux-cored wires contained $CaF_2$ in the amount of 15% in addition to the components indicated in the table under E and F.
B was added as ferroboron (B = 20%).

The results of tests conducted on the examples are shown in Table 5.

When welding wire of the specified composition of this invention is used, the amounts of C, Ti and B contained in the weld metal fall in the ranges of 0.07–0.13%C, 0.004–0.035%Ti and 0.001–0.005%B, respectively. As clearly shown in the samples, B, D, F, H, I, J, K and L of Table 5, when the requirements of this invention are satisfied, no cracks occur in the longitudinal bead bend test and the vE value at −60° C. is satisfactory.

On the other hand, however, when a conventional welding wire or a wire containing more C than that of this invention is used, the content of C becomes less than 0.06% or becomes 0.20%, with the result that the occurrence of a fine crack in the longitudinal bead bend test can be observed. It is also seen that the vE value at −60° C. sometimes falls below 3.0 kg-m.

TABLE 5

| No. | Composition of Weld Metal (%) | | | Number of Cracks* | vE-60° C. (kg-m) mean value/ minimum | Remarks |
|---|---|---|---|---|---|---|
| | C | Ti | B | | | |
| A | 0.20 | 0.020 | 0.0052 | 19 | 7.5/3.2 | Comparison |
| B | 0.080 | 0.019 | 0.0048 | 0 | 16.4/15.9 | This invention |
| C | 0.060 | 0.025 | 0.0024 | 4 | 16.2/13.8 | Comparison |
| D | 0.087 | 0.026 | 0.0022 | 0 | 18.5/16.3 | This invention |
| E | 0.041 | 0.020 | 0.0019 | 26 | 6.8/2.9 | Comparison |
| F | 0.078 | 0.018 | 0.0018 | 0 | 12.4/11.3 | This invention |
| G | 0.052 | 0.037 | 0.0038 | 8 | 4.2/2.8 | Comparison |

TABLE 5-continued

| No. | Composition of Weld Metal (%) | | | Number of Cracks* | vE-60° C. (kg-m) mean value/ minimum | Remarks |
|---|---|---|---|---|---|---|
| | C | Ti | B | | | |
| H | 0.077 | 0.020 | 0.0036 | 0 | 9.5/8.2 | This invention |
| I | 0.075 | 0.022 | 0.0045 | 0 | 14.8/13.3 | This invention |
| J | 0.13 | 0.005 | 0.0021 | 0 | 10.5/8.8 | This invention |
| K | 0.081 | 0.032 | 0.0028 | 0 | 13.2/12.0 | This invention |
| L | 0.075 | 0.017 | 0.0013 | 0 | 11.8/10.5 | This invention |
| M | 0.070 | 0.012 | 0.0023 | 0 | 3.2/2.3 | Comparison |
| N | 0.076 | 0.020 | 0.0025 | 3** | 9.8/8.2 | Comparison |
| O | 0.045 | 0.028 | 0.0032 | 12 | 6.5/2.8 | Comparison |
| P | 0.14 | 0.025 | 0.0033 | 11 | 8.8/5.3 | Comparison |
| Q | 0.072 | 0.026 | 0.0008 | 0 | 4.5/2.7 | Comparison |
| R | 0.073 | 0.002 | 0.0022 | 0 | 3.9/2.1 | Comparison |

*Number of cracks in the longitudinal bead bend test.
**Cracks initiated from slag inclusions.

We claim:

1. A method for submerged-arc welding steel, which comprises submerged-arc welding steel containing 0.005-0.06%C using a welding wire containing more than 0.18%, up to 0.55%C, and also using a welding flux, wherein at least one member selected from the group consisting of Ti and B is added to at least one member selected from the group consisting of said welding wire and said welding flux, whereby the resultant weld metal contains 0.07-0.13%C and also contains Ti and B.

2. A method as claimed in claim 1 wherein said weld metal contains 0.004-0.035%Ti and 0.001-0.005%B.

3. A method as claimed in claim 1 wherein said submerged-arc welding is carried out using a solid wire containing more than 0.18%, up to 0.55%C, 0.01-0.5%Si, 0.9-3.5%Mn, 0.004-0.035%Ti and 0.002-0.010%B.

4. A method as claimed in claim 3 wherein said solid wire further contains at least one member selected from the group consisting of up to 0.6%Mo and up to 3.5%Ni.

5. A method as claimed in claim 1 wherein said welding flux contains at least one member selected from the group consisting of rutile and titanium slag containing 5-30% in terms of $TiO_2$, and at least one member selected from the group consisting of boric acid, borate and boron containing 0.05-1.0% in terms of $B_2O_3$.

6. A method as claimed in claim 1 wherein said welding flux contains 0.5-5%Fe-Ti in terms of Fe-Ti having a Ti content of 50%, and 0.07-1.7%Fe-B in terms of Fe-B having a B content of 20%.

7. A method as claimed in claim 5 or 6 wherein said welding flux has a basicity of 0.5-2.5.

8. A method as claimed in claim 1 wherein said submerged-arc welding is carried out using a solid wire containing more than 0.18%, up to 0.55%C, up to 0.035%Ti, and up to 0.010%B, and a welding flux containing at least one member selected from the group consisting of rutile and titanium slag which contains up to 30% in terms of $TiO_2$, and at least one member selected from the group consisting of boric acid, borate and boron which contains up to 1.0% in terms of $B_2O_3$.

9. A method as claimed in claim 1 wherein said submerged-arc welding is carried out using a solid wire containing more than 0.18%, up to 0.55%C, up to 0.035%Ti, and up to 0.010%B, and a welding flux containing up to 5%Fe-Ti in terms of Fe-Ti having a Ti content of 50%, and up to 1.7%Fe-B in terms of Fe-B having a B content of 20%.

10. A method as claimed in claim 1 wherein said submerged-arc welding is carried out using a solid wire containing more than 0.18%, up to 0.55%C, 0.01-0.5%Si, 0.9-3.5%Mn, up to 0.035%Ti, and up to 0.010%B, and a welding flux containing at least one member selected from the group consisting of rutile and titanium slag which contains up to 30% in terms of $TiO_2$, and at least one member selected from the group consisting of boric acid, borate and boron which contains up to 1.0% in terms of $B_2O_3$.

11. A method as claimed in claim 1 wherein said submerged-arc welding is carried out using a solid wire containing more than 0.18%, up to 0.55%C, 0.01-0.5%Si, 0.9-3.5%Mn, up to 0.035%Ti, and up to 0.010%B, and a welding flux containing up to 5%Fe-Ti in terms of Fe-Ti having a Ti content of 50%, and up to 1.7%Fe-B in terms of Fe-B having a B content of 20%.

12. A method as claimed in claim 1 wherein said submerged-arc welding is carried out using a solid wire containing more than 0.18%, up to 0.55%C, 0.01-0.5%Si, 0.9-3.5%Mn, up to 0.035%Ti, up to 0.010%B, and at least one member selected from the group consisting of up to 0.6%Mo and up to 3.5%Ni, and a welding flux containing at least one member selected from the group consisting of rutile and titanium slag which contains up to 30% in terms of $TiO_2$, and at least one member selected from the group consisting of boric acid, borate and boron which contains up to 1.0% in terms of $B_2O_3$.

13. A method as claimed in claim 1 wherein said submerged-arc welding is carried out using a solid wire containing more than 0.18%, up to 0.55%C, 0.01-0.5%Si, 0.9-3.5%Mn, up to 0.035%Ti, up to 0.010%B, and at least one member selected from the group consisting of up to 0.6%Mo and up to 3.5%Ni, and a welding flux containing up to 5%Fe-Ti in terms of Fe-Ti having a Ti content of 50%, and up to 1.7%Fe-B in terms of Fe-B having a B content of 20%.

* * * * *